No. 773,348. Patented October 25, 1904.

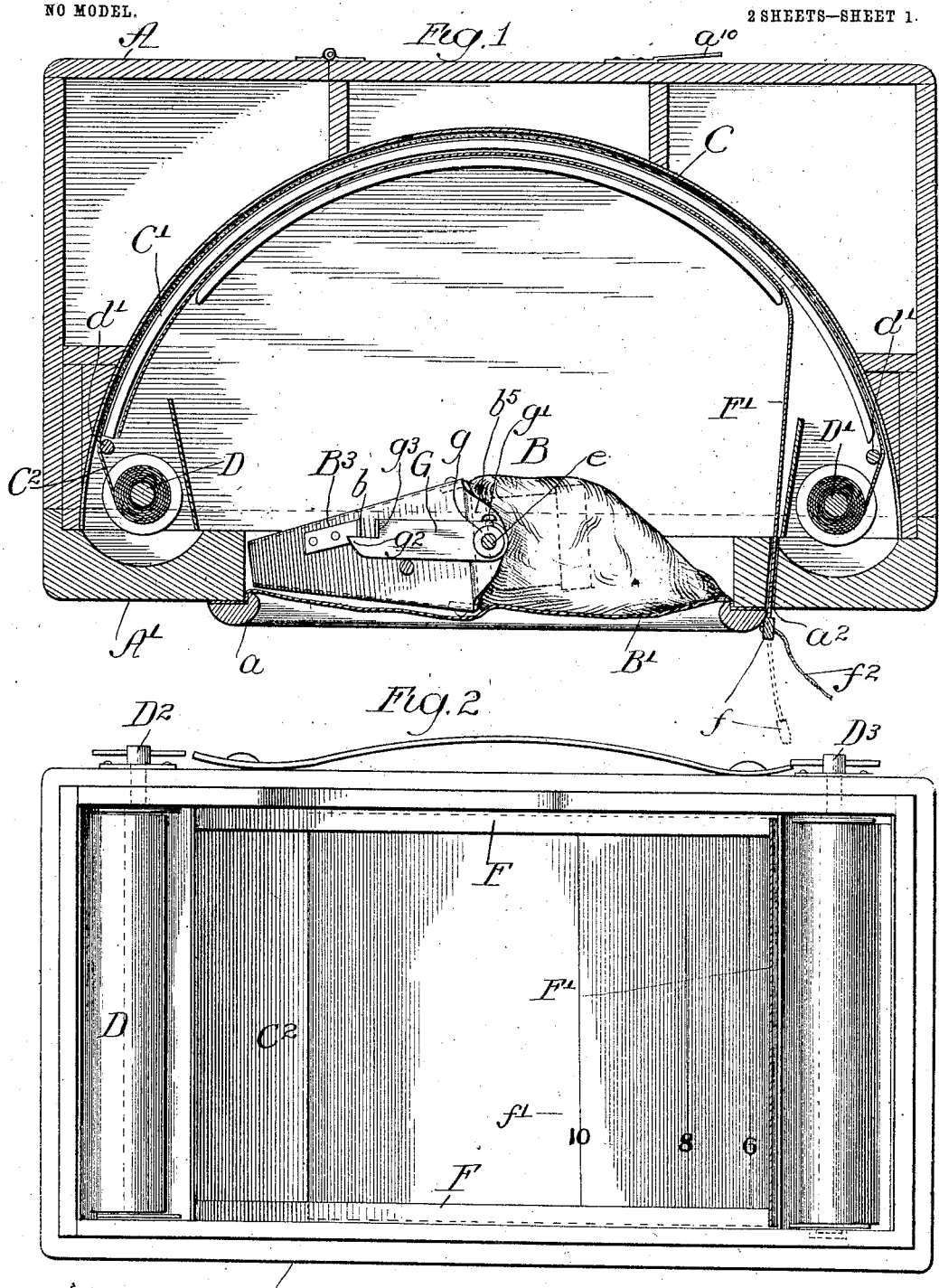

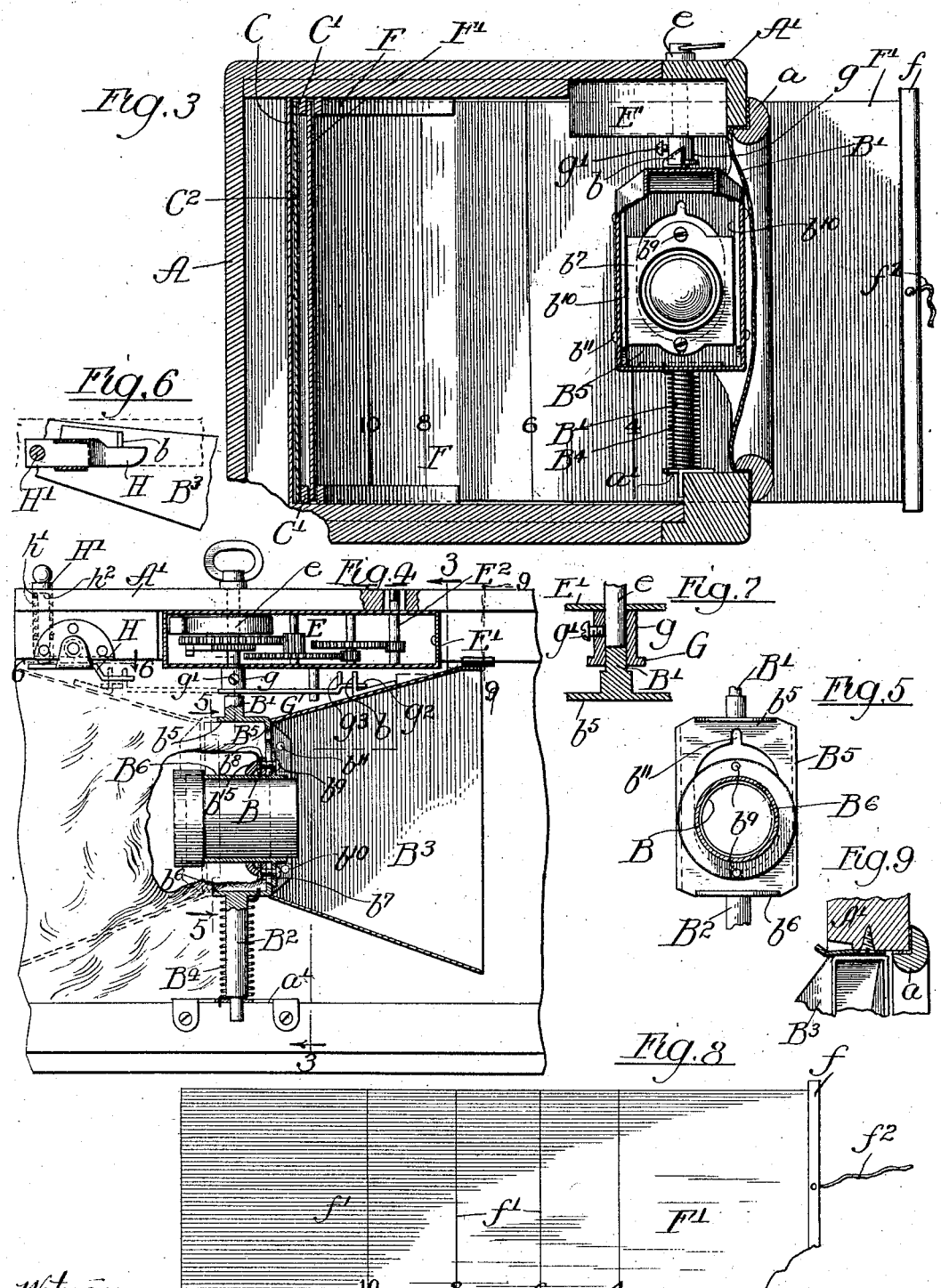

UNITED STATES PATENT OFFICE.

LEONARD J. SMITH, OF BURLINGTON, WISCONSIN, ASSIGNOR TO THE MULTISCOPE & FILM COMPANY, OF BURLINGTON, WISCONSIN, A CORPORATION OF WISCONSIN.

PANORAMIC CAMERA.

SPECIFICATION forming part of Letters Patent No. 773,348, dated October 25, 1904.

Application filed February 15, 1904. Serial No. 193,598. (No model.)

*To all whom it may concern:*

Be it known that I, LEONARD J. SMITH, a citizen of the United States, residing at Burlington, in the county of Racine and State of Wisconsin, have invented certain new and useful Improvements in Panoramic Cameras; and I do hereby declare that the following is a full, clear, and exact description thereof, reference being had to the accompanying drawings, and to the letters of reference marked thereon, which form a part of this specification.

This invention relates to improvements in panoramic cameras, and refers more specifically, first, to a shield or screen for cutting off more or less of the film to the exposure of light passing through the lens, and thereby regulating the length of the negative; second, to a mechanism for controlling the swing of the lens-holder in a manner to provide for time or instantaneous exposure, and, third, to an improved mounting for the lens-holder, whereby it may be raised or lowered with respect to the film-support, and to other features of the holder and its light-cone.

The invention consists in the matters hereinafter set forth, and more particularly pointed out in the appended claims.

Among the objects of the invention is to provide an improved device for limiting or determining the length of exposure of the film, and thereby the length of the negative produced, and a further object of the invention is to improve the construction and operation of the other parts of the camera mentioned.

As shown in the drawings, Figure 1 is a horizontal section of a camera embodying my improvements. Fig. 2 is a front view thereof with the lid or cover removed and showing the film and film-spools. Fig. 3 is a transverse section of the camera, taken on the indirect line 3 3 of Fig. 4, with parts broken away. Fig. 4 is a partial inside view of the front cover of the camera-box, showing the lens-holder and light-cone and the means for swinging said holder for instantaneous and time exposures, some of the parts being shown in section. Fig. 5 is a vertical section taken on line 5 5 of Fig. 4. Fig. 6 is a detail illustrating the manner of locking the lens-holder in its set position. Fig. 7 is a detail section taken on line 6 6 of Fig. 4. Fig. 8 is a plan view of the light shield or screen shown in a flat position. Fig. 9 is a detail section taken on line 9 9 of Fig. 4.

My improvements are herein shown as applied to the construction of a camera which is generally similar to that illustrated in the prior Letters Patent of Peter N. Angsten, No. 671,154, granted on the 2d day of April, 1901.

As shown in said drawings, A designates as a whole the camera-box provided with a removable front wall or cover A', which carries the lens-holder B, said front wall or cover being provided with an opening in which said lens-holder is mounted to swing and which opening is closed by a light-excluding cloth B', which is confined at its outer margins between the front or removable wall and a suitable removable frame or molding $a$, which is fitted into said opening. Said cloth is provided with a central opening through which the holder extends, the margin of the cloth around the central opening closely surrounding and being attached to the holder.

$B^3$ designates a light cone or casing which directs the light rearwardly from the lens-holder to the film in rear of said holder.

C designates a curved vertical film-support which is located within the box in rear of the swinging lens-holder and extends from end to end of the box, with its concave side facing the lens-holder, and C' C' designate upper and lower curved guide-strips which are located in front of the upper and lower margins of said film-support and between which and the said support is formed guide-grooves to guide the upper and lower margins of the film $C^2$.

D D' designate spools located in the front corners of the box and journaled in the upper and lower walls thereof and the film being unwound from the spool D and wound upon the spool D'. Said spools are contained in chambers from which light is excluded. The shafts of the film-spools D D' are provided above the upper wall of the box with turning devices $D^2$ $D^3$, by which the film is wound upon and unwound from the spools. Guide-rollers $d'$ are located adjacent to the spools to properly direct the film. The features of construction thus far described are generally like the prior Angsten construction before referred to.

The lens-holder B is mounted on a vertical oscillatory or rotative plate $B^5$, the plate being provided with a central opening and the holder extending at its rear end through said opening and being affixed to a plate in a manner hereinafter to be described. Said plate is provided with upper and lower forwardly-extending flanges $b^5$ $b^6$, to which are affixed upper and lower shafts $B'$ and $B^2$, about the axis of which the plate and holder carried thereby swing. The lower shaft $B'$ is rotatively mounted at its lower end in a stepped bearing $a'$ on the lower rim of the removable cover, as seen in Figs. 3 and 4, and the upper shaft is reduced and has rotative bearing in the lower end of the hub $g$ of a lever or arm G, which latter is connected with the spring-actuated shaft $e$ of a spring-motor, (designated as a whole by the reference-letter E,) said shaft $e$ having bearing in the upper rim or flange of the removable front wall and in the upper and lower walls of the motor-casing $E'$. The hub of the swinging arm $g$ is affixed to the spring-actuated shaft by means of a set-screw $g'$ and the lower end of the bore of the hub receives the upper reduced end of the shaft $B'$, as shown in Fig. 7.

$B^4$ designates the actuating-spring for the lens-holder for instantaneous exposures, said spring surrounding the lower shaft $B^2$ and being affixed at one end to the bearing $a'$ and at its other end to the shaft or a part turning therewith. The arm G swings in response to the spring-motor, and its function is to retard the swing of the holder for time exposures, as will more fully hereinafter appear.

Referring now to the means for cutting off more or less of the film from exposure to light to produce pictures of different lengths, these parts are made as follows: F F designate upper and lower curved guides located in front of the curved guide $C'$ for the film and constituting between the two guides a curved groove which receives a sheet material, (light-excluding shield or screen $F'$,) which is adapted to be withdrawn from and inserted into said groove from the exterior of the camera-box. Said screen is made of any suitable light-excluding material which will adapt itself to the curvature of its guide-groove. Sheet-celluloid treated to render the same light-proof is an approved material. Said screen is inserted into the box through a vertical slot $a^2$, in the front removable wall thereof, as shown more clearly in Fig. 1, and the screen is made of such length that when inserted fully into place, or when its inner end extends approximately to the guide-roller $d'$ remote from the slot $a^2$, and therefore fully covers the film, the outer end thereof projects from the box a sufficient distance to enable it to be readily grasped to withdraw the screen. Such exposed end of the screen is preferably thickened or provided with a stop-strip $f$ to limit its insertion into said slot, the strip also serving as a handle for the screen.

As herein shown, the screen when withdrawn from its innermost position first uncovers that part of the film which is exposed in the last part of the swing of the lens-holder, or, in other words, on that side adjacent to the light-cone when the holder is in its thrown-over position. Said screen is provided with lines $f'$, extending thereacross, as shown in Fig. 9, and constituting graduated scale-marks, by which the user of the camera may know how much of the film is being exposed when the screen is partially withdrawn. Said scale-marks coöperate with the edge of said slot $a^2$ and are so arranged that when a mark designated by a given number shows just at the edge of the slot it indicates that a length of film is exposed corresponding in inches with that number. In other words, if the length of the negative desired be four inches the screen will be withdrawn until the scale-line designated by the figure "4" is just exposed through the slot $a^2$. The guide F is located so close to the film as to prevent the passage of light between the rear end of the screen with respect to its direction of withdrawal, and thus prevent the exposure of the covered part of the film. In Fig. 1 the screen is shown in full lines as fully covering the film and in dotted lines as partially withdrawn and is shown in full lines in Fig. 2 as partially withdrawn. Desirably a cord or string $f^2$ is attached to the outer end of the screen, which is adapted to be attached at its free end to a clip $a^{10}$ or the like at the rear of the camera, Fig. 1, to hold the screen in a given adjustment.

Heretofore it has been the practice to provide the lens-holder or the light-cone $B^3$ with a shutter which is adapted to be automatically closed at the end or at some intermediate part of the swing of the lens-holder and in this manner cut off the passage of light to the film and control the length of the picture. Difficulty has been experienced, however, in providing shutter mechanism which operates with such precision and accuracy as to sharply cut off the light, and, furthermore, it has been found, notwithstanding the extra precautions taken to control and admit the action of the light, such reflection takes place at the time the lens-holder is open as to blur to a greater or less extent the part of the film which it is not desired to expose to the light. For these reasons, therefore, it has been difficult to produce uniformly sharp lines of demarcation between successive exposures on the film. The device herein shown for controlling this feature of the operation of the camera has been found to produce very excellent results in this respect. The device, moreover, is simple and one capable of ready attachment to the camera and by reason of this simplicity is not likely to get out of order, such as are adjustable shutter mechanisms.

Referring now to the mechanism whereby the camera is adapted for instantaneous as well as time exposures, this mechanism is made as follows: As before stated, the lens-holder is adapted to be swung from one limit to the other of its swing under the influence of the spring $B^4$, surrounding the lower shaft of the lens-holder. Normally the said lens-holder operates under the tension of said spring and when free or released after being set in the position shown in dotted lines in Fig. 4 passes quickly to the other limit of its movement, as shown in full lines of Fig. 4, for instantaneous exposure.

The means for setting the lens-holder at one limit of its movement preparatory to taking a picture and subsequently releasing the same are made as follows: When the lens-holder is moved into its set position, as shown in dotted lines in Fig. 4, it places the spring $B^4$ under tension, so that when the holder is released it throws the holder quickly to the other limit of its movement and during such swing subjects the film to an instantaneous exposure. The means for setting the lens-holder at one limit of its movement is made as follows: The light-cone $B^3$ is provided on its top wall with a lug $b$, extending upwardly therefrom, and said lug $b$ is adapted for locking engagement with a pivoted spring-pressed latch H on the rim of the removable wall when the holder is set preparatory to exposing the film for a picture, said lug being adapted to snap under said latch and the latch falling in front of the lug to lock the lens-holder in its set position in the manner indicated in Fig. 6. The latch normally stands with its operative end in its lowermost position and swings upwardly to receive and release the lug on the light-cone. The latch is released by the means of an endwise-movable plunger H', which is seated in a suitable socket in the upper rim of the removable front wall and is normally held in its uppermost position by means of a spring $h'$, which bears at its upper end against a shoulder $h^2$ on the plunger and at its lower end against an internal shoulder of the socket which receives said spring. The lower end of said plunger is attached to the end of the latch remote from the end which engages said lug $b$. With this construction when the lens-holder is locked in its starting position, with the latch in front of the lug $b$, and when the locking end of said latch is raised by depressing the plunger H' the lens-holder is free to swing from one limit of its movement to the other under the action of the spring $B^4$. The means for placing said lens-holder under the influence of the spring-motor, and thereby cause the lens-holder to swing more leisurely from one side to the other of its movement for time exposures, are made as follows: The outer or free end of the arm G is provided with an outwardly-extending lug $g^2$, which extends outwardly past and is adapted for contact with the lug $b$ of the light-cone. Said lever is also provided with an upwardly-extending lug $g^3$, radially inside of the lug $g^2$. Said upwardly-extending lug $g^3$ is adapted to pass under the latch H, whereby said arm G is locked in position by said latch, and when the latch is released by depression of the plunger H' said arm is released. It will be observed that inasmuch as the lug $g^2$ of said arm stands in front of the lug $b$ on the light-cone when the latter is in its thrown-over position, as indicated in full lines in Fig. 4, if the arm G be swung to the limit of its swing by rotation of the shaft $e$ of the spring-motor it will carry with it the light-cone and the lugs $b$ $g^3$ both pass under and are restrained by the latch H. At this time the tension of the motor-spring acts to return the arm G, while the spring $B^4$ acts to return the holder; but inasmuch as the arm G retards the swing of the cone and inasmuch as it swings back to its normal position more slowly than the holder tends to swing said holder is retarded. The action of the spring-motor may be regulated by the use of the well-known wind-governor, which may be attached to a shaft $E^2$, geared to the motor and extending at its upper end and through the rim of the removable cover, as shown in Fig 4.

Referring now to the means for raising and lowering the lens-holder to change the foreground of the picture or negative, it will be observed by inspection of Figs. 3, 4, and 5 of the drawings that the lens-holder is fitted in a tube $B^6$, which is detachably connected with the plate $B^5$. Said tube $B^6$ is slipped through the opening of said plate from the rear of the plate, and the tube is provided in rear of the plate with a flange $b^7$, between which and a washer $b^8$ in front of the said plate the said plate is confined, said flange and washer being clamped upon said plate by means of screws $b^9$, extending through the flange and washer. The opening in the plate $B^5$ is vertically elongated, so that by loosening the screws $b^9$ the tube and holder may be adjusted vertically, and thereby change the position of the holder relatively to the film, thus changing the foreground of the picture. Between said outer washer $b^8$ and a second washer $b^{15}$ is confined the margin of the cloth B' around the central hole through which extends the lens-holder.

The plate $B^5$ is provided at its side margins with rearwardly-directed margins $b^{10}$, and the front end of the light-cone passes outside of the said flanges and is attached thereto by means of screws $b^{11}$, as shown in Figs. 1 and 3.

The light-cone is made of considerable width at its front end and gradually tapers at its rear end and is open or free throughout its length, inasmuch as no shutter mechanism is required which operates with said holder or cone.

In order to prevent the light-cone from rebounding at the end of its swing, and thereby cause a reëxposure of the film over the length covered by such rebound, a holding device is provided, which, as herein shown, is made as follows: J designates a spring-plate, which is attached to the upper rim of the removable cover, as shown in Figs. 4 and 9, and which extends inwardly toward the film-support and is inclined slightly upwardly at its free end, as shown in Fig. 9. The position of said spring is such that the inner end of the cone passes beneath the spring, and, owing to the inclined position of the spring, the cone engages the same with a wedging action and prevents rebound of the cone and lens-holder. The engagement of the spring with the cone is so light, however, as to afford no substantial lock to prevent the cone being readily swung to its set position.

I claim as my invention—

1. The combination with a camera-box, a swinging lens-holder, a curved film-support and spools at the sides of said support upon which the film is wound and unwound, of a movable screen located between the film-support and holder, and adapted by movement thereof to expose more or less of the film extending between said spools in said support.

2. The combination with a camera-box, a spring-actuated swinging lens-holder, and a film-support, of a screen located between said support and holder, said screen being of sufficient length to cover the film throughout the length of the support and being movable to uncover at will any length of the film desired.

3. The combination with a camera-box, a swinging lens-holder and a film-support, of an endwise-movable sheet-material screen located between the film-support and holder and extending at one end outside of the camera-box, and located so close to the film-support as to exclude light from the film behind the screen in all positions of withdrawal of the screen.

4. The combination with a camera-box, a swinging lens-holder, and a curved film-support in rear of said holder, of a sliding sheet-material screen between said support and holder, and excluding light from the film in rear of said screen, the camera-box being provided in its front wall with a slot outwardly through which the end of the screen extends.

5. The combination with a camera-box, a swinging lens-holder, and a curved film-support in rear of said holder, of a sliding sheet-material screen between said support and holder, the box-wall being provided with a slot outwardly through which the end of the screen extends, a cord on the outer end of the screen and a hook or lug on the exterior of the box to which said cord is adapted to be attached.

6. The combination with a camera-box, a swinging lens-holder, and a curved film-support in rear of said holder, of a sheet-material screen between said support and holder, the box-wall being provided with a slot outwardly through which the end of the screen extends, said screen being provided with a plurality of scale-marks.

7. The combination with a camera-box, a swinging lens-holder, a curved film-support in rear of the holder and upper and lower curved guides in front of the film-support, of a sheet-material screen sliding between the said curved guides and the film-support and located so closely to the film-support as to exclude light from the film behind the screen in all positions of its withdrawal, the screen extending at its end outside of the camera-box.

8. In a panoramic camera, the combination with a swinging lens-holder and its actuating-spring, of a spring-actuated retarding mechanism, a swinging arm connected with and actuated in the direction of the spring-actuated swing of the lens-holder by said retarding mechanism and connections between the free end of said arm and a part carried by the holder whereby said arm is adapted to retard the speed of the swing of the holder.

9. In a panoramic camera, the combination with a swinging lens-holder and its light-cone, of a lug on said cone, a latch adapted for locking engagement with the lug to hold said holder in its set position preparatory to taking a picture, means for releasing said latch and a retarding device adapted to act on said holder to retard the swing of the holder when released.

10. In a panoramic camera, the combination with a swinging lens-holder, of a part carried by the lens-holder, a latch adapted for releasable locking engagement with said part to lock the holder in its set position, a spring-actuated retarding mechanism, a swinging arm connected with and actuated by the retarding mechanism to swing the arm in the direction of the spring-actuated swing of the lens-holder, said arm being adapted for locking engagement with said latch and having releasable interlocking connection with the holder in a manner to retard the swinging speed of the lens-holder.

11. In a panoramic camera, the combination with a swinging lens-holder and its light-cone, of a lug on said light-cone, a latch adapted for engagement with said lug to lock the cone in its set position, means for releasing said latch from the lug to permit the cone to swing to the opposite limit of its movement, a spring-pressed retarding mechanism, an arm connected therewith which is impelled in the same direction which the lens-holder is impelled by its actuating-spring, said arm being adapted for locking engagement with said latch and provided with a part which is adapted for releasable interlocking engagement with the lug on said light-cone.

12. In a panoramic camera, the combination with the lens-holder, of a vertical oscillatory plate provided at its upper and lower ends with bearing-shafts, an actuating-spring surrounding one of the shafts, said plate being provided with a vertically-elongated opening, and means for supporting said lens-holder in said opening constructed to permit vertical adjustment of the holder in the plate.

13. In a panoramic camera, the combination with the lens-holder, of a vertical, oscillatory plate provided at its upper and lower ends with bearing-shafts, an actuating-spring surrounding one of the shafts, said plate being provided with a vertically-elongated opening, a tube extending through said opening and in which said lens-holder is carried, and means for securing said tube to the plate constructed to permit of vertical adjustment of the tube in said opening.

14. In a panoramic camera, a swinging lens-holder mounting comprising a vertical, oscillatory plate provided with upper and lower bearing-shafts, an actuating-spring surrounding one of said shafts, a lens-holder carried by said plate, said plate being provided with rearwardly-directed flanges, and a light-cone extending rearwardly from said plate and attached to said flanges.

15. In a panoramic camera, a swinging lens-holder mounting comprising a vertical plate provided at its upper and lower ends with forwardly-directed flanges bearing-shafts extending upwardly and downwardly, respectively, from said flanges, an actuating-spring for said holder, said plate being provided with an opening, a lens-holder extending through said opening, and a light-cone extending rearwardly from said lens-holder.

16. In a panoramic camera, a swinging lens-holder mounting comprising a vertical, oscillatory plate provided with upper and lower bearing-shafts, an actuating-spring surrounding one of said shafts, said plate being provided with a vertically-elongated opening, a tube extending through said opening, a lens-holder therein, said tube being provided at one end with a flange, a washer surrounding said tube on the side of the plate opposite said flange, and clamping-screws extending through said flange and washer for clamping the tube on the plate.

17. In a panoramic camera, the combination with the camera-box, a swinging lens-holder and its cone, of means frictionally engaging the cone at the end of the exposure swing of the holder and acting to prevent rebound of the cone and holder under the action of the actuating-spring for said holder.

18. In a panoramic camera, the combination with the camera-box, a swinging lens-holder and its cone, of a yielding part attached to the box at the limit of the swing of the cone and adapted to engage the cone with a wedging action.

In testimony that I claim the foregoing as my invention I affix my signature, in presence of two witnesses, this 8th day of February, A. D. 1904.

LEONARD J. SMITH.

Witnesses:
  C. B. ZIMMERMANN,
  ELLA M. PRASCH.